(12) United States Patent
Iwasa et al.

(10) Patent No.: US 6,188,466 B1
(45) Date of Patent: Feb. 13, 2001

(54) IMAGE FORMING APPARATUS AND TWO-DIMENSIONAL LIGHT-EMITTING ELEMENT ARRAY

(75) Inventors: Izumi Iwasa, Nakai-machi; Masao Ito, Ebina, both of (JP)

(73) Assignee: Fuji Xerox Co., Ltd., Tokyo (JP)

( * ) Notice: Under 35 U.S.C. 154(b), the term of this patent shall be extended for 0 days.

(21) Appl. No.: 09/389,592

(22) Filed: Sep. 3, 1999

(30) Foreign Application Priority Data

Sep. 25, 1998 (JP) .................................................. 10-271646

(51) Int. Cl.[7] .......................... G03B 27/54; G03B 27/52; G03G 15/043; B41J 2/385
(52) U.S. Cl. .............................. 355/70; 355/41; 399/51; 347/130; 347/237; 347/238; 347/247; 347/249
(58) Field of Search .......................... 355/41, 70; 399/51; 347/130, 237, 238, 247, 249

(56) References Cited

U.S. PATENT DOCUMENTS

| 5,138,337 | * | 8/1992 | Ng ........................................ 346/107 |
| 5,754,216 | * | 5/1998 | Higuchi et al. ....................... 347/238 |
| 5,926,201 | * | 7/1999 | Fleming et al. ...................... 347/237 |
| 6,002,420 | * | 12/1999 | Tanioka et al. ....................... 347/237 |
| 6,025,858 | * | 2/2000 | Tanioka et al. ....................... 347/129 |

FOREIGN PATENT DOCUMENTS

| 8-292384 | 11/1996 | (JP) . |
| 9-200431 | 7/1997 | (JP) . |

OTHER PUBLICATIONS

R. P. Dooley et al., Noise Perception in Electrophotography, Journal of Applied Photographic Engineering, vol. 5, No. 4, pp. 190–196, (1979).

* cited by examiner

Primary Examiner—Russell Adams
Assistant Examiner—Khaled Brown
(74) Attorney, Agent, or Firm—Oliff & Berridge, PLC

(57) ABSTRACT

Regardless of a relative installation position error between a light source and a photosensitive material, or of a deviation from a properly preset value of rotation speed of a photosensitive material, images are obtained with minimum loss of image quality and excellent reproducibility. The number m of light-emitting elements to make up a unit and the distance between adjacent pixels formed on the photosensitive surface are adjusted such that the width of the pixel groups is $\frac{1}{3}$ mm or less, which is a period that the periodic image noise is not recognized as stripes.

8 Claims, 10 Drawing Sheets

VISUAL TRANSFER FUNCTION (VTF)
OF HUMAN EYES

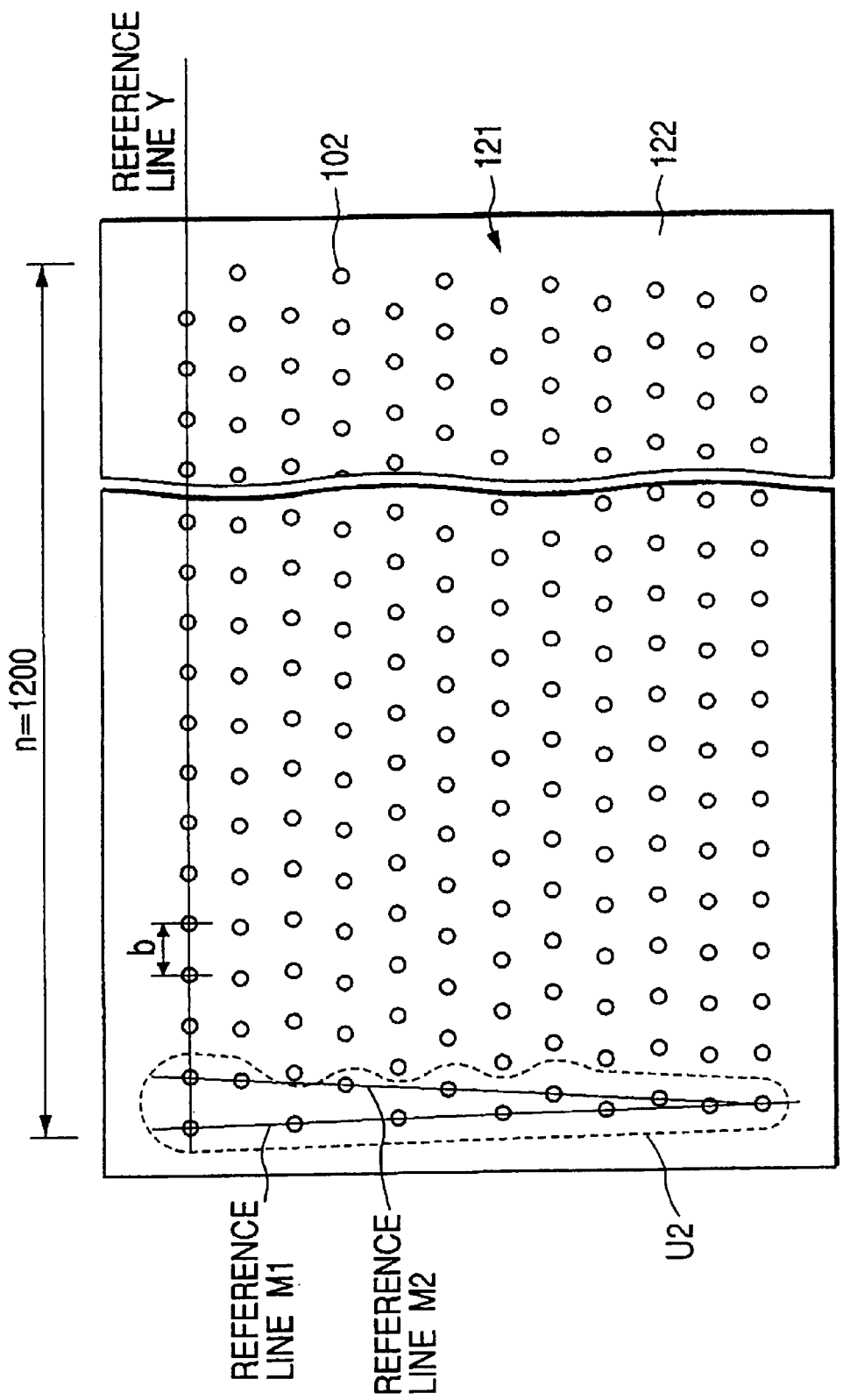

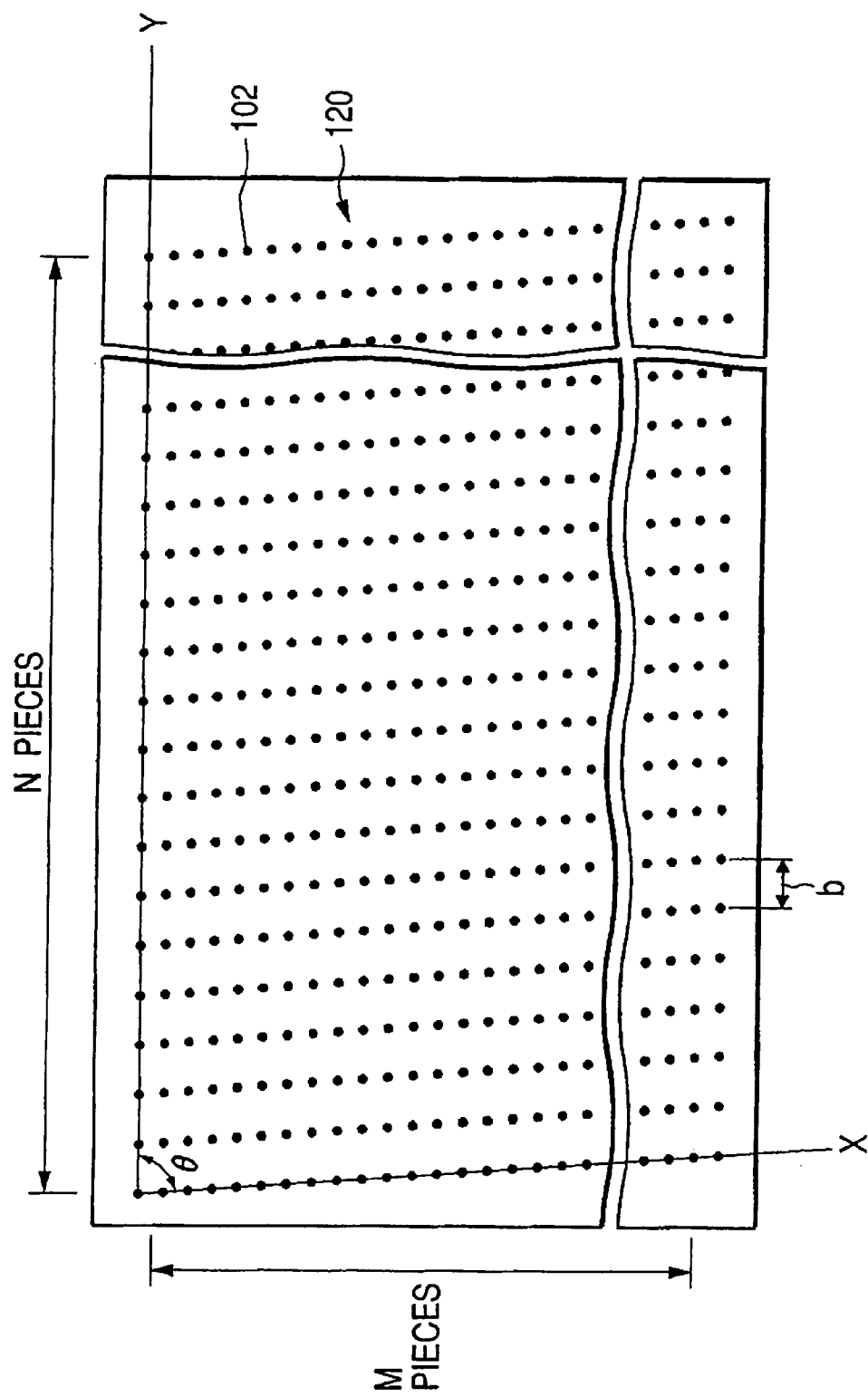

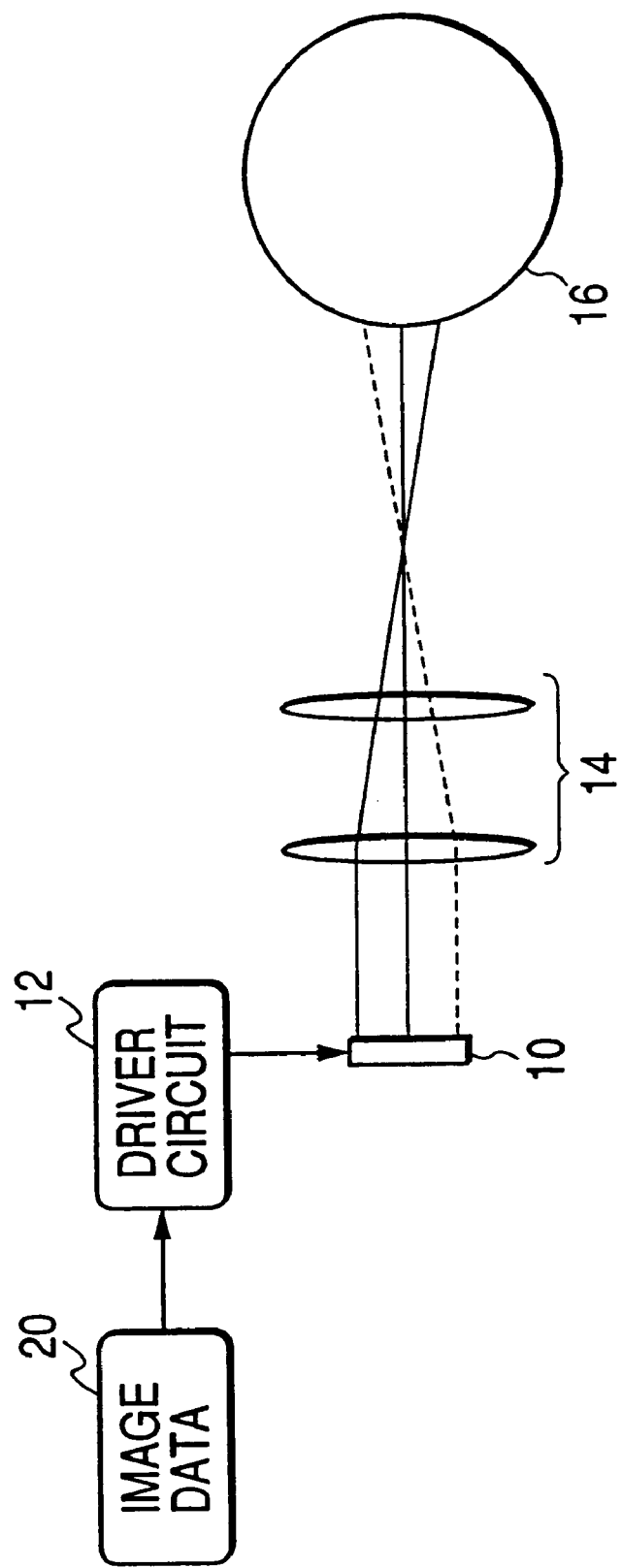

IMAGE FORMING APPARATUS AND TWO-DIMENSIONAL LIGHT-EMITTING ELEMENT ARRAY

BACKGROUND OF THE INVENTION

1. Field of the Invention

The present invention relates to an image forming apparatus and a two-dimensional light-emitting element array, and more particularly to an image forming apparatus such as a printer and a digital copier which uses a two-dimensional light-emitting element array such as a two-dimensional vertical-cavity surface-emitting laser array, a two-dimensional LED array, and a liquid crystal shutter array as a light source, in which a plurality of light-emitting elements are two-dimensionally disposed, and to a two-dimensional light-emitting element array in which a plurality of light-emitting elements such as vertical-cavity surface-emitting lasers, LED's, and liquid crystal shutters are two-dimensionally disposed.

2. Description of the Related Art

There is disclosed in, e.g., Japanese Published Unexamined Patent Application No. Hei 9-200431, an image forming apparatus which, as a light source, uses a two-dimensional light-emitting element array in which a plurality of minute light-emitting elements are two-dimensionally arranged.

FIG. 5 shows a brief configuration of the image forming apparatus which uses a two-dimensional light-emitting element array. The image forming apparatus comprises: a light source 10 configured with a two-dimensional light-emitting array; a driver circuit 12 for controlling the radiation status of the light source 10; a projection lens system 14 for guiding light from the light source 10 to the surface of a photosensitive drum 16; and a photosensitive drum 16 on the surface of which a latent image is formed by light irradiation.

The driver circuit 12 controls the radiation status of two-dimensional light-emitting elements 102 (see FIG. 4) making up the light source 10, based on image data 20 input from a storage part such as a memory or an external input part. Thereby, the light beams emitted from the light-emitting elements 102 based on the image data 20 are magnified by the projection lens system 14 and are irradiated onto the surface of the photosensitive drum 16, and a latent image conforming to the image data 20 is formed on the surface of the photosensitive drum 16.

In such an image forming apparatus, the two-dimensional light-emitting element array 120 used as the light source 10, as shown in FIG. 4, is formed by m×n light-emitting elements 102, in which one unit is constituted by m light-emitting elements 102 disposed at equal intervals on a reference line X, which extends in a slanting direction crossing at an angle θ with a reference line Y extending horizontally, and n units are disposed at equal intervals on the reference line Y.

Light from the two-dimensional light-emitting element array 120 forms n×m pixels 104 on the photosensitive drum, as shown in FIG. 6A, n pixels along a reference line N, which extends in the primary scanning direction, and m pixels along a reference line M, which crosses at an angle θ with the reference line N. (Although n pieces of reference line M can be defined for n light-emitting elements, only one is shown herein.) The magnification by the projection lens system 14 is adjusted so that the distance d between two adjacent pixels in the primary scanning direction is set to a given value determined from the resolution of the image forming apparatus.

Pixels formed on the photosensitive drum by a light-emitting element at a specific location, as shown in FIG. 6B, are formed in such a way that a pixel 104a is formed by the first irradiation and a pixel 104b is formed by the next irradiation at a position which is at a given distance d' from the pixel 104a and along a secondary scanning line on the photosensitive drum where the secondary scanning line is perpendicular to the primary scanning direction. As a result of repeating this process, m×n pixels 104 are arranged in the primary scanning direction. Thereby, as shown in FIG. 7, a two-dimensional image is obtained in which m×n secondary scanning lines are formed along the primary scanning direction.

In an image forming apparatus configured as described above, with a rotation axis defined by the optical axis of the two-dimensional light-emitting element array, if the two-dimensional light-emitting element array is installed in deviation to a position where it is rotated at angle Δθ around the rotation axis from the proper position, pixels 104c formed on the surface of the photosensitive drum, as shown in FIG. 8A, are disposed along a reference line N1 obtained by rotation of an angle of Δθ with respect to the normal reference line N.

Therefore, the pixel array formed on the surface of the photoconductive drum, as shown in FIG. 8B, has periodical gaps in every m pixels determined by the number of light-emitting elements in one unit in the two-dimensional light-emitting element array. If the two-dimensional light-emitting element array is installed at a position where it is rotated in the reverse direction of the foregoing, periodical overlaps occur in the pixel array with a period of m pixels.

The gap or overlap occurs in a period $\Lambda$ represented by an expression $\Lambda = m \cdot d$, where d is the distance between the adjacent pixels in the primary scanning direction on the photosensitive material. Hence, streak noise of spatial frequency 1/md appears on the image ultimately obtained, causing degradation of the image quality.

If the drum moves at a higher speed than the properly preset speed, pixels formed on the photosensitive drum, as shown in FIG. 9B, are positioned above the primary scanning lines along the secondary scanning lines. Conversely, if the drum moves at a lower speed than the properly preset speed, pixels formed on the photosensitive drum are positioned below the primary scanning lines along the secondary scanning lines.

Such deviation of pixel positions from the primary scanning lines is periodically repeated with a period of m pixels determined by the number of light-emitting elements in one unit in the two-dimensional light-emitting array.

Since the period of the pixel deviation is represented by the same expression $\Lambda = m \cdot d$, image deviation noise of spatial frequency 1/md appear as stripes on the image ultimately obtained, causing degradation of the image quality.

The foregoing description of the streak noise and image deviation noise (hereinafter referred to as image noise) has been made for a two-dimensional light-emitting element array in which a unit of light-emitting elements arranged at equal intervals on the reference line X extending in a slanting direction with respect to the reference line Y is repeatedly arranged along the reference line Y. The image noise also arise with a two-dimensional light-emitting element array in which a unit of m light-emitting elements disposed complicatedly in the vertical direction is repeatedly arranged along the reference line Y.

Therefore, in an image forming apparatus which, as a light source, uses a two-dimensional light-emitting element array in which light-emitting elements are two-dimensionally arranged, image noise of period md and spatial frequency 1/md occurs due to an installation error or a rotation speed error of the rotation drum, causing degradation of the image quality.

By the way, to make a halftone image with an image forming apparatus, mesh patterns each of which, as shown in FIG. 10, consists of q pixels in the primary scanning direction and p pixels in the secondary scanning direction are used. The period of the mesh patterns in the primary scanning direction on the surface of the photosensitive material is represented by q·d, where d is the distance between the adjacent pixels in the primary scanning direction on the surface of the photosensitive material.

If such mesh patterns are used, the presence of the above-mentioned image noise of period m·d coming from the light source causes moire fringes because of the interference between fluctuation of period q·d and fluctuation of period m·d.

The period of the moire fringes is E·d, which is determined by the least common multiple, E, of q and m. Accordingly, in addition to the above-mentioned image noise, noise of spatial frequency 1/Ed occurs, causing further degradation of the image quality.

In the related art, a method as disclosed in Japanese Published Unexamined Patent Application No. Hei 8-292384 has already been proposed. This method improves the image reproducibility by imposing some limited relationship between the number of elements and the distances between scanning lines for an apparatus which forms images by scanning multi-beam light sources having a plurality of laser elements horizontally arranged in a row.

However, when a two-dimensional light-emitting element array is used as a light source as described above, no measures are taken against image quality degradation due to periodical disturbance of a pixel array caused by a relative installation position error between the light source and a photosensitive material, or to a deviation from a setting value of rotation speed of the photosensitive material, nor against image quality degradation due to moire fringes caused by the interference between the mesh patterns set for halftone image and the above-mentioned image noise.

SUMMARY OF THE INVENTION

A first object of the present invention is to provide an image forming apparatus resistant to image quality degradation and exhibiting an excellent image reproducibility regardless of a relative installation position error between a light source and a photosensitive material, or of a deviation from a properly preset value of rotation speed of the photosensitive material.

A second object of the present invention is to provide an image forming apparatus which can use mesh patterns to make a halftone image without the risk of causing moire fringes.

A third object of the present invention is to provide a two-dimensional light-emitting element array used as a light source of an image forming apparatus, which is resistant to image quality degradation even if it is installed in deviation to a position where it is rotated around the optical axis of the two-dimensional light-emitting element array as a rotation axis.

A fourth object of the present invention is to provide a two-dimensional light-emitting element array used as the light source of an image forming apparatus, which is resistant to image quality degradation even if the movement speed of a photosensitive material irradiated with light by the two-dimensional light-emitting element array is deviated from a properly preset speed.

To achieve the above-mentioned objects, an image forming apparatus of the invention according to claim 1 comprises: a two-dimensional light-emitting element array comprising a plurality of units in which a unit consists of a predetermined number of light-emitting elements arranged in a slanting direction with respect to a predetermined direction, and a plurality of units are arranged in parallel in the predetermined direction, in such a way that each light-emitting element forms a pixel train comprising a plurality of irradiated areas disposed in a chain in the secondary scanning direction on a photosensitive surface by relative movement between the light-emitting element and the photosensitive material and that each unit forms a pixel group comprising a predetermined number of pixel trains on the photosensitive surface thereby the pixel trains are arranged regularly along the primary scanning direction on the photosensitive material, such that pixel trains at the end of pixel groups adjacent to each other, formed on the photosensitive surface by units adjacent to each other are formed regularly; and an optical system for projecting irradiated light from the two-dimensional light-emitting element array onto the photosensitive surface, wherein the number of light-emitting elements in one unit and the spacing between the pixel trains formed in a chain on the photosensitive surface are adjusted such that the width of the pixel group is smaller than a certain period that the pixel groups are not recognized as stripes.

That is, image noise, as described above, occurs in the period of the width of a pixel group formed on the surface of a photosensitive material by one unit of light-emitting elements. Accordingly, in the invention of claim 1, by adjusting at least the number of light-emitting elements in one unit to determine the period of image noise or the spacing between the pixel trains formed on the photosensitive surface such that the width of the pixel groups is smaller than a certain period that the image noise is not recognized as streaks, the image noise becomes difficult to recognize and seemingly excellent image quality is obtained. Since the spacing between the pixel trains is a value determined by a required resolution, the number of light-emitting elements in one unit is determined to meet the required resolution.

According to the present of claim 1, even if periodical streaks occur on a photosensitive material due to an installation position error between the light source and the photosensitive material, or to a deviation from a properly preset value of rotation speed of the photosensitive material, since the period of the streaks is adjusted to an unrecognizable level, there is seemingly little degradation in the quality of images obtained and an image forming apparatus having excellent image reproducibility is obtained.

According to the invention of claim 2, in an image forming apparatus set forth in claim 1, at least the number of light-emitting elements of one unit or the spacing between the pixel trains formed in a chain on the photosensitive surface is adjusted such that the width of the pixel groups is ⅓ mm or less.

That is, a characteristic curve shown in FIG. 2 is known as to the image resolution of human eyes. This characteristic curve shows a relationship between the visual transfer function (VTF) on the vertical axis and the number of cycles in 1 mm on the horizontal axis, that is, the spatial frequency of images, indicating how the recognition sensitivity by the naked eye changes with the spatial frequency of images. The Visual transfer function (VTF) is normalized to a reference value of 1 at a spatial frequency of 1 cycle/mm at which the streaks are easily recognized; the smaller the value of the visual transfer function, the more difficult it becomes to recognize streaks (Roger P. Dooley and Rodney Shaw: "Noise perception in Electrophotography", Journal of Applied Photographic Engineering, Volume 5, Number 4, Fall 1979, pp. 190–196).

As apparent from FIG. 2, this characteristic curve is nonlinear and an increase of the spatial frequency reduces the value of VTF like a parabolic function. Specifically, since for the spatial frequency of three or greater the value of VTF is reduced to such an extent that streaks are difficult to recognize, in the invention of claim 2, at least the number of light-emitting elements in one unit or the spacing between the pixel trains on the photosensitive surface is adjusted such that the width of pixel groups is ⅓ mm or less, preferably ¼ mm or less.

Since such adjustment makes the period of streaks formed on a photosensitive material little recognizable to human eyes, seemingly streak-free, excellent images are obtained.

A plurality of light-emitting elements making up one unit may be arranged linearly at equal intervals in a slanting direction with respect to the arrangement direction of the units, or as set forth in claim 3, light-emitting elements may be arranged on two or more lines that extend in slanting directions with respect to the unit arrangement direction, such as, e.g., V-character shape and N-character shape.

The linear arrangement of light-emitting elements at equal intervals in a slanting direction with respect to the arrangement direction of the units has the advantage of relatively simple configuration and easy manufacturing. If light-emitting elements are arranged as set forth in claim 3, since light-emitting elements at the end of units adjacent to each other are positioned relatively near to each other, the distance between pixel trains at the end of pixel groups adjacent to each other formed on the photosensitive surface will not widen. In other words, in comparison with the case where light-emitting elements are arranged linearly at equal intervals in a slanting direction with respect to the arrangement direction of the units, since the configuration as in the invention of claim 3 reduces the distances between pixel groups, even if two-dimensional light-emitting element arrays are installed with a somewhat low precision, the occurrence of streaks is suppressed. Accordingly, the installation precision of two-dimensional light-emitting element arrays need not be so strict, so that the advantage of improved installation efficiency is obtained.

In the invention of claim 4, an image forming apparatus includes a two-dimensional light-emitting element array comprising a plurality of units in which a unit consists of a predetermined number of light-emitting elements arranged in a slanting direction with respect to a predetermined direction, and a plurality of units are arranged in parallel in the predetermined direction, in such a way that each light-emitting element forms a pixel train comprising a plurality of irradiated areas disposed in a chain in the secondary scanning direction on a photosensitive surface by relative movement between the light-emitting element and the photosensitive material and that each unit forms a pixel group comprising a predetermined number of pixel trains on the photosensitive surface thereby the pixel trains are arranged regularly along the primary scanning direction on the photosensitive material, such that pixel trains at the end of pixel groups adjacent to each other, formed on the photosensitive surface by units adjacent to each other are formed regularly; and reproduces halftone by mesh patterns each consisting of a block of a predetermined number of pixels adjacent to each other on the photosensitive surface, wherein the image forming apparatus adjusts the number of pixels of the mesh patterns in the width direction along the arrangement direction of the units and the number of light-emitting elements in one unit such that the period of moire fringes determined by the least common multiple of the number of pixels of the mesh patterns along the direction on the photosensitive surface corresponding to the arrangement direction of the units and the number of light-emitting elements in one unit is a period that the moire fringes are not recognized as streaks.

That is, in the case where mesh pattern are used to reproduce halftone by an image forming apparatus, moire fringes occur due to the interference between the periodic mesh patterns each consisting of a block of a predetermined number of pixels adjacent to each other on a photosensitive surface and the periodic fluctuation of image noise coming from the two-dimensional light-emitting element array. The period of the moire fringes is determined by the product of the least common multiple of the number of light-emitting elements in a unit and the number of pixels in the mesh pattern along the primary scanning direction on the photosensitive surface, and the spacing between the pixel trains formed in a chain on the photosensitive surface.

Accordingly, the invention of claim 4 adjusts the number of pixels of the mesh pattern along the primary scanning direction on the photosensitive surface and the number of light-emitting elements in one unit to determine the period of image noise such that the period of moire fringes is a period that the moire fringes are not recognized as streaks.

By constructing the two-dimensional light-emitting element array and the mesh pattern so as to meet such conditions, the period of streaks formed on the photosensitive surface can be brought into such a level that it is unrecognizable to most human eyes. Hence, for images with periodical streaks formed on the photosensitive material due to an installation position error between the light source and the photosensitive material, or deviation from a properly preset value of rotation speed of the photosensitive material, even if halftone is reproduced using mesh patterns comprising a large number of pixels, seemingly streak-free, excellent images are obtained.

Preferably, as in the invention of claim 5, by setting the number of pixels of mesh patterns along the primary scanning direction to a divisor of the number of light-emitting elements in one unit, the period of moire fringes can be brought into agreement with the period of the image noise coming from an installation position error of the light source and a deviation from a setting value of rotation speed of the photosensitive material. Since the period of the moire fringes is minimized by this process, the number of pixels of the mesh patterns and the number of light-emitting elements of the each unit can be relatively easily adjusted that the moire fringes are not recognized as streaks.

As described in claim 2, if the period of streaks is set to a value of ⅓ mm or less derived from the characteristic curve of FIG. 2, preferably a value of ¼ mm or less, the streaks are difficult to recognize. Therefore, in the invention of claim 6, the number of pixels in the width direction of mesh pattern and the number of light-emitting elements of the each unit are adjusted such that the period of the moire fringes is set to ⅓ mm or less, preferably ¼ mm or less. Since such adjustment makes the period of streaks formed on a photosensitive material little recognizable to human eyes, seemingly streak-free, excellent images are obtained.

A two-dimensional light-emitting element array of the invention of claim 7 is configured such that it comprises a plurality of units in which a unit consists of a predetermined number of light-emitting elements arranged in a slanting direction with respect to a predetermined direction, and a plurality of units are arranged in parallel in the predetermined direction, in such a way that each light-emitting element forms apixel train comprising a plurality of irradiated areas disposed in a chain in the secondary scanning direction on a photosensitive surface by relative movement between the light-emitting element and the photosensitive material and that each unit forms a pixel group comprising a predetermined number of pixel trains on the photosensitive surface thereby the pixel trains are arranged regularly along the primary scanning direction on the photosensitive material, such that pixel trains at the end of pixel groups adjacent to each other, formed on the photosensitive surface by units adjacent to each other are formed regularly, wherein the number of light-emitting elements in one unit is determined such that the width of pixel groups formed on the photosensitive surface through a projection lens system with a predetermined magnification is a period that the pixel groups are not recognized as streaks.

Specifically, when a two-dimensional light-emitting element array of the present invention is used as a light source for an image forming apparatus, even if periodical streaks are formed on the photosensitive surface due to installation of the two-dimensional light-emitting element array in deviation to a position where it is rotated with the optical axis thereof as a rotation axis, or deviation from a properly preset value of the movement speed of the photosensitive surface, the configuration of the two-dimensional light-emitting element array is determined such that the period of the streaks is not recognized. As a result, seemingly streak-free image groups are formed on the photosensitive surface. Since the distance between elements is determined by a required resolution and the magnification of a projection lens system, the number of light-emitting elements in one unit is adjusted to conform to the required resolution.

As in the invention of claim 8, by adjusting the number of light-emitting elements in one unit such that the width of the pixel groups is ⅓ mm or less, since the period of streaks formed on the photosensitive surface can be made little recognizable to human eyes for the same reason as described in claim 7, seemingly streak-free, excellent images can be formed.

BRIEF DESCRIPTION OF THE DRAWINGS

FIG. 3 is a top view showing an outline of a two-dimensional light-emitting element array of a second embodiment of the present invention.

FIG. 4 is a top view showing an outline of a conventional two-dimensional light-emitting element array.

FIG. 5 is a schematic diagram of an image forming apparatus using a two-dimensional light-emitting element array.

DESCRIPTION OF THE PREFERRED EMBODIMENTS

First Embodiment

Figure 1:
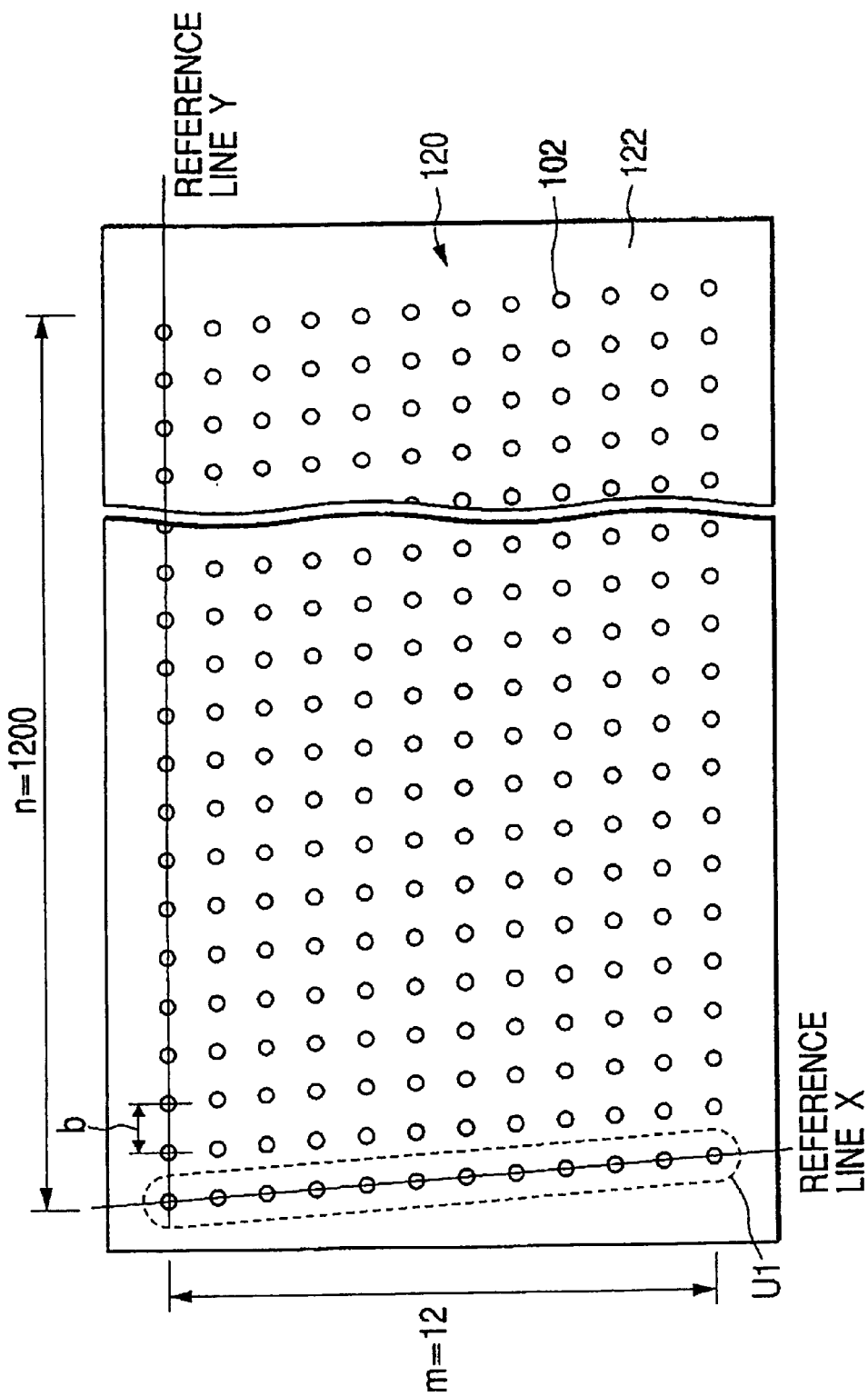
FIG. 1 is a top view showing an outline of a two-dimensional light-emitting element array of a first embodiment of the present invention.

A two-dimensional light-emitting element array 120 shown in FIG. 1 has an about 0.5- by 50-mm area of a GaAs substrate in which 12 light-emitting elements 102 to make up a unit U1 (a block of 12 light-emitting elements enclosed by the dashed line) are arranged at an interval of 42 $\mu$m on a reference line X crossing at an angle $\theta$ with a reference line Y wherein the reference line Y extends to a direction corresponding to a primary scanning direction on a photosensitive material and the reference line X crosses with the reference line Y at a predetermined angle $\theta$ (=85.24°), and 1,200 units are arranged in parallel at an interval of 42 $\mu$m along the reference line Y. When I is an integer from 1 to 12 (position of an I-th light-emitting element of one unit) and J is an integer from 1 to 1200 (position of J-th unit of all units), coordinates (x, y) of the light-emitting elements 102 can be represented by the following expression:

$$(x, y)=(42(I-1), 3.5(I-1)+42(J-1))$$

where y is the coordinate in the direction parallel to the reference line Y, and x is the coordinate in the direction perpendicular to the reference line Y.

A description will be made of the case where a two-dimensional light-emitting element array 120 thus configured is used as the light source 10 of an image forming apparatus configured as shown in FIG. 5 to form images of resolution 1200 dpi on the surface of a photosensitive material. Since a resolution of 1200 dpi denotes that 1,200 pixels are arranged at equal intervals in a 1-inch line (=25.4 mm), the distance d between adjacent pixels on the photosensitive surface is defined as 25.4/1200≈21 $\mu$m.

In the first embodiment, light from the two-dimensional light-emitting element array 120 is magnified to six times by the optical system 14 before being projected onto the rotation drum 16 on the surface of which a photosensitive surface is formed. The driver circuit 12 for controlling the radiation status of the two-dimensional light-emitting element array 120 controls the two-dimensional light-emitting element array 120 such that a light-emitting element at a position corresponding to the image data 20 emits light once each time the photosensitive surface moves 21 $\mu$m by the rotation of the rotation drum 16.

Accordingly, on the photosensitive surface of the rotation drum surface, 14,400 pixels will be produced at an interval of 21 $\mu$m over a width of about 300 mm in the primary scanning direction (direction corresponding to a parallel direction of units of the two-dimensional light-emitting element array).

In an image forming apparatus thus configured, the period of image noise that would be generated when the two-dimensional light-emitting element array 120 is misinstalled rotationally by an angle Δθ around the optical axis or the rotation speed of the rotation drum is deviated from a properly preset value would be about 0.25 mm because m·d≈0.25 mm, where m=12 and d=21 μm.

Figure 2:
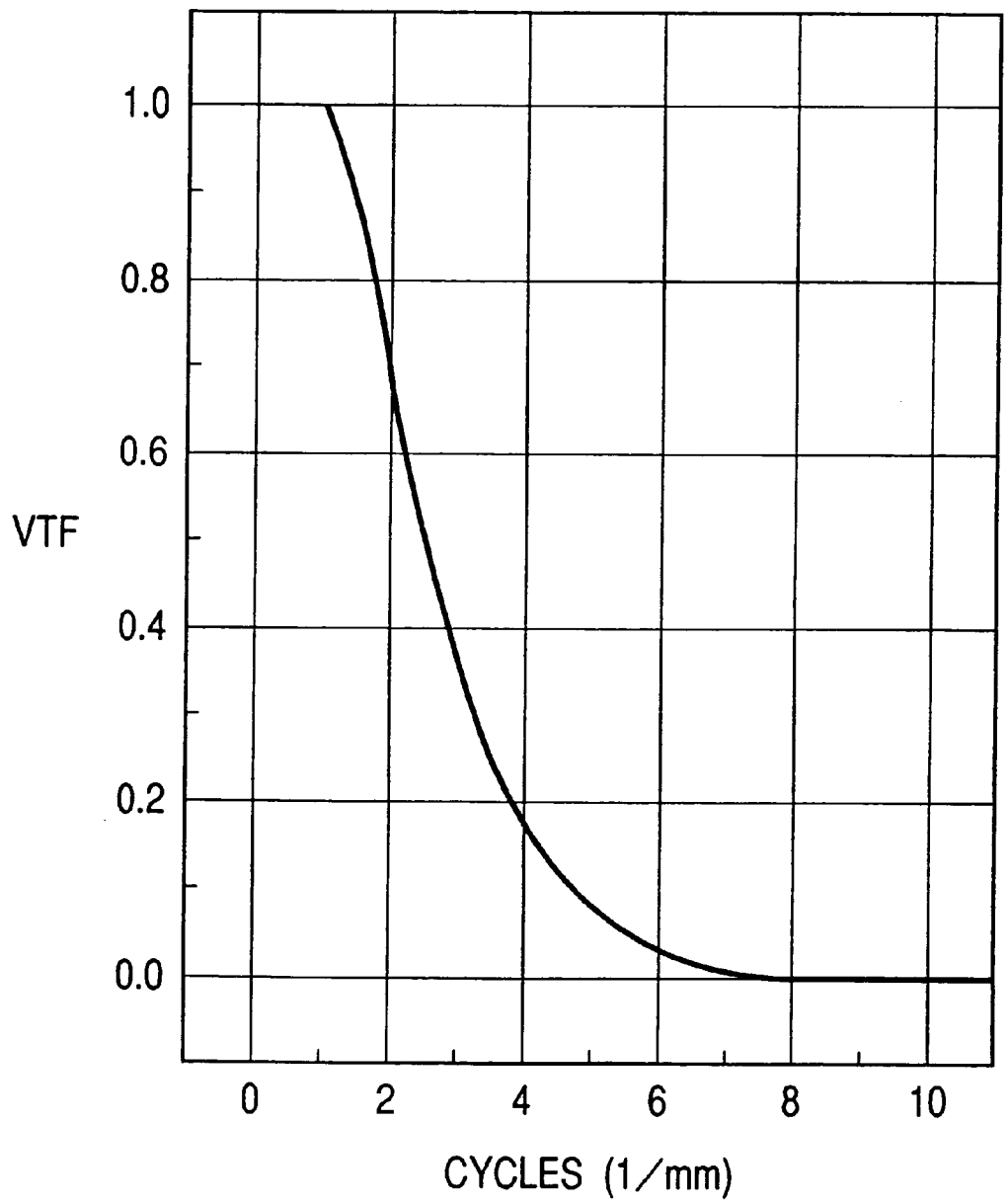
FIG. 2 is a characteristic curve showing image resolution of human eyes.
Figure 6A:
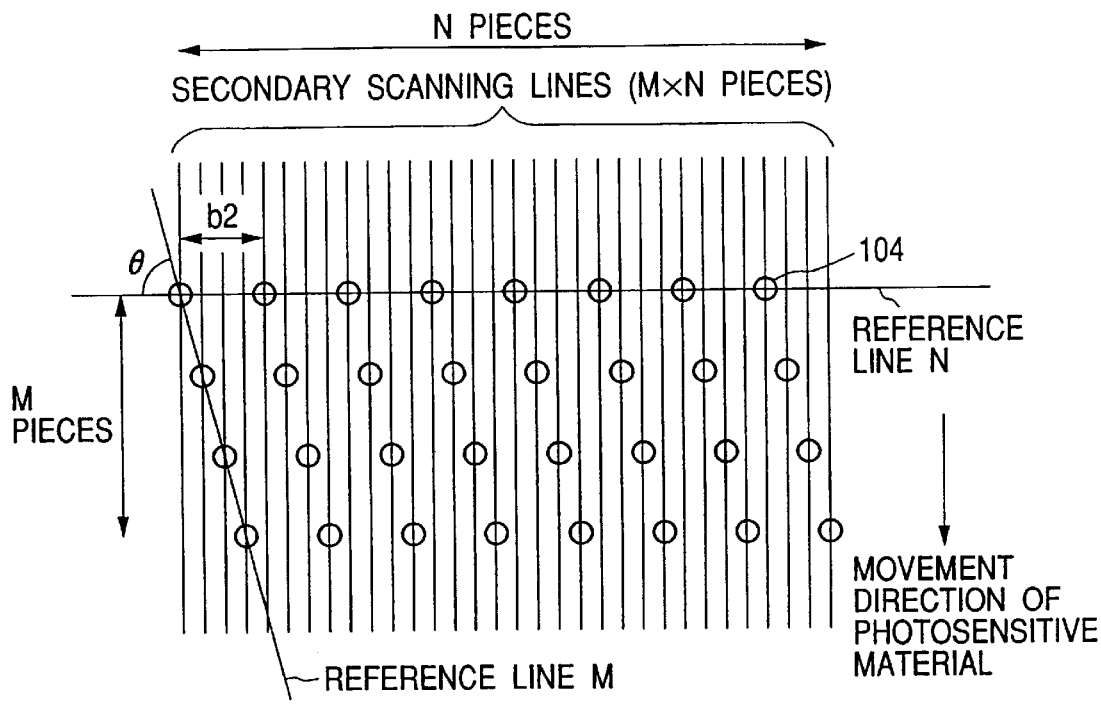
FIGS. 6A and 6B are explanatory drawings for explaining the arrangement of pixels formed on a photosensitive surface by light from a two-dimensional light-emitting element array.
Figure 6B:
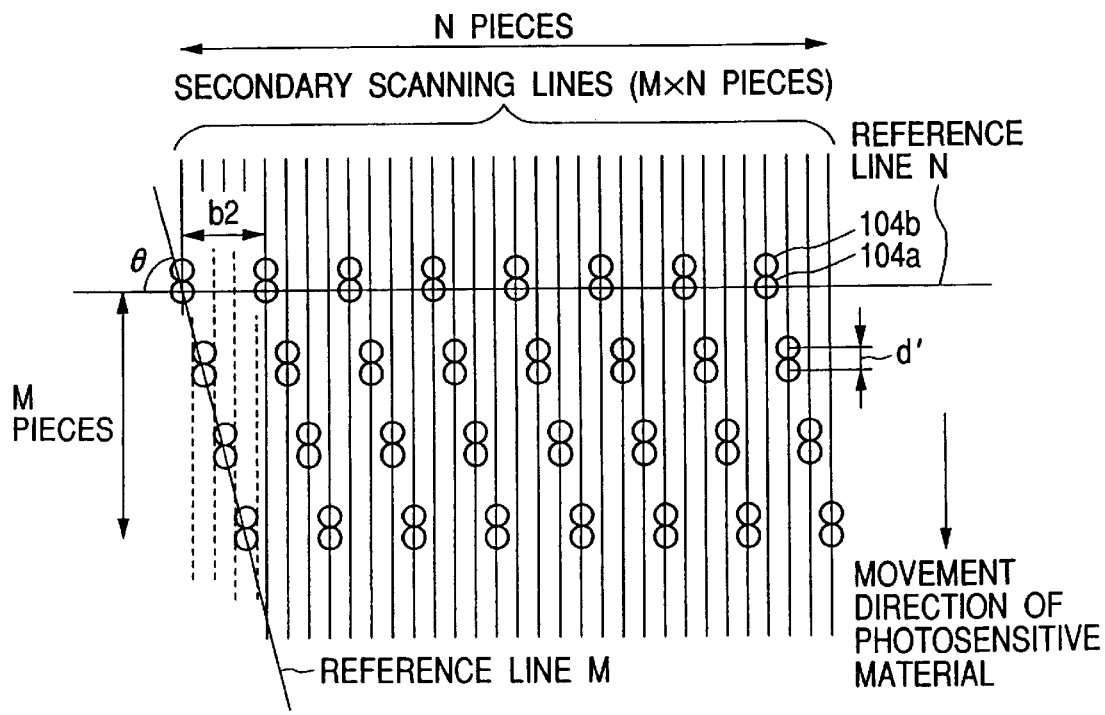
Figure 7:
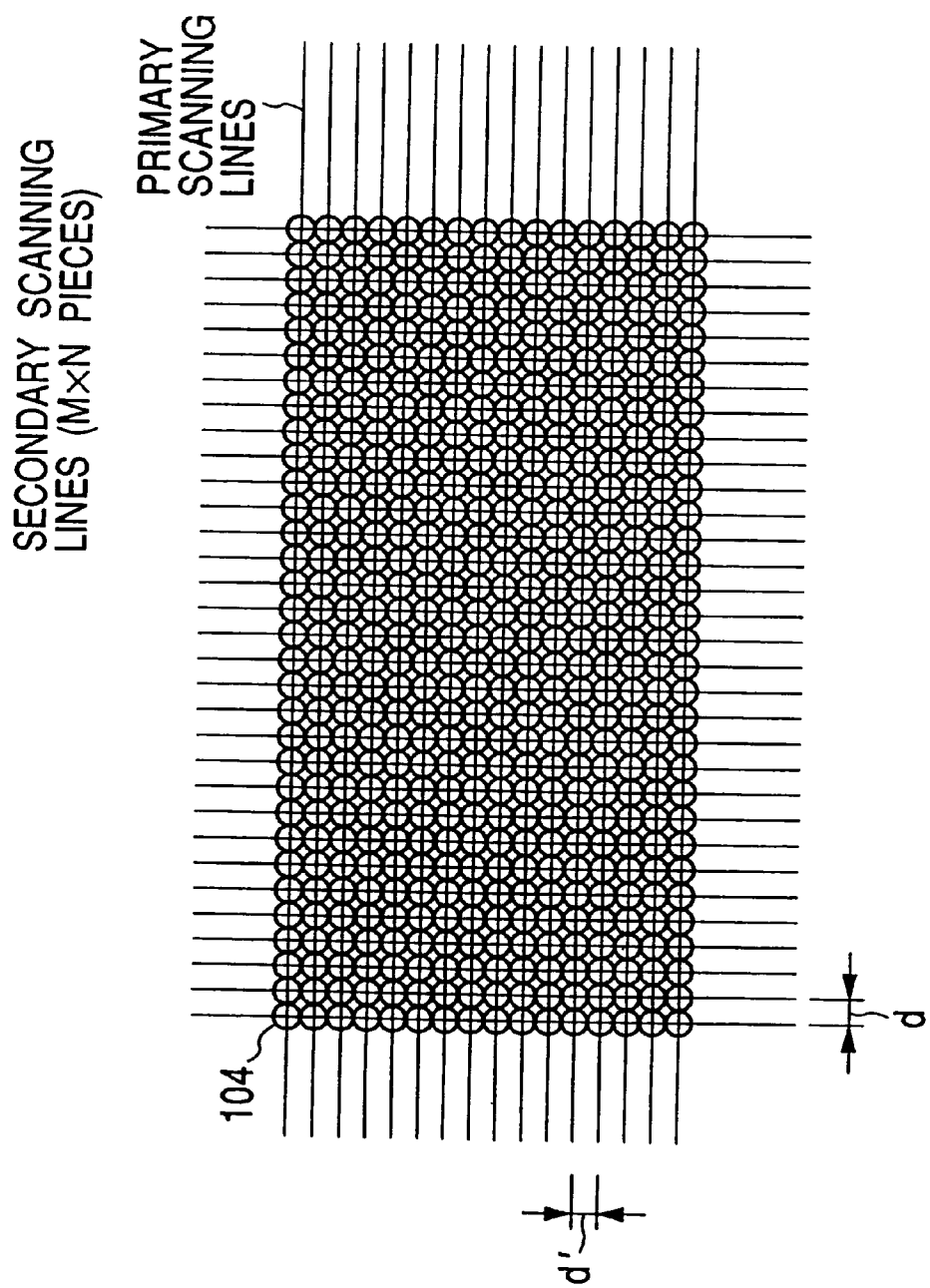
FIG. 7 is an explanatory drawing for explaining the arrangement of pixels formed on a photosensitive surface when no image noise occurs.
Figure 8A:
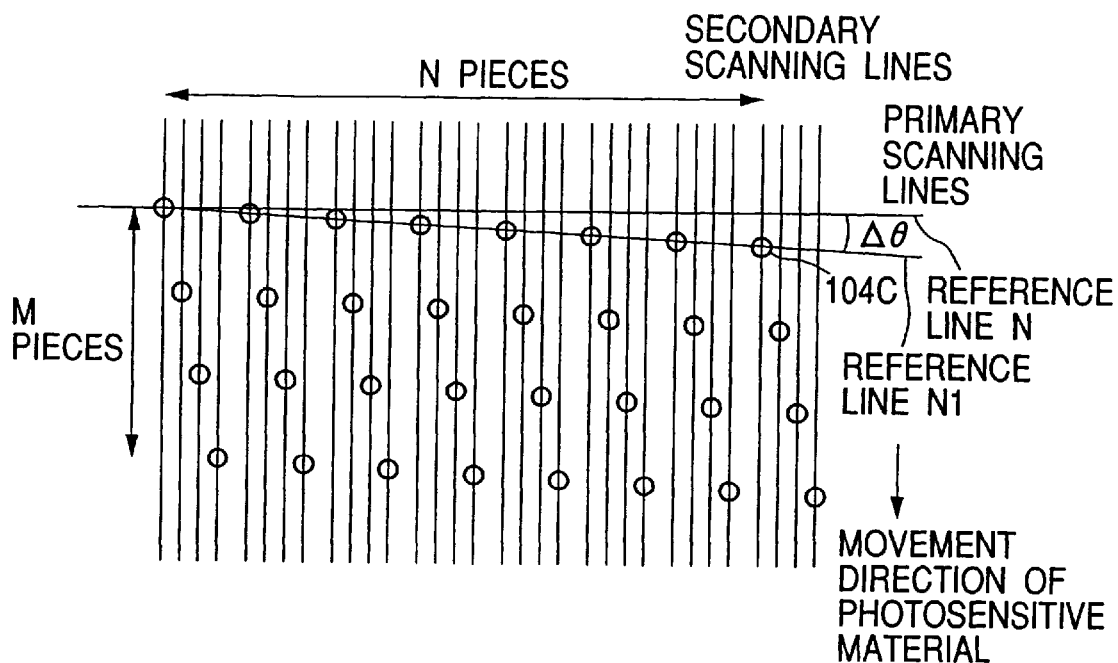
FIGS. 8A and 8B are explanatory drawings f or explaining the arrangement of pixels formed on a photosensitive surface when a two-dimensional light-emitting element array is misinstalled rotationally by an angle $\Delta\theta$.
Figure 8B:
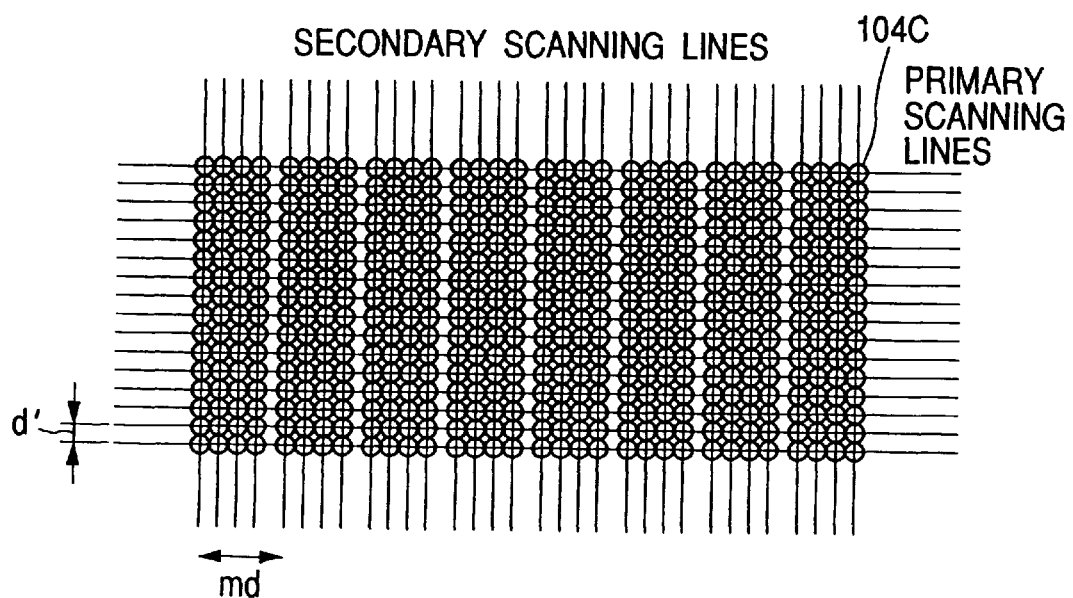
Figure 9A:
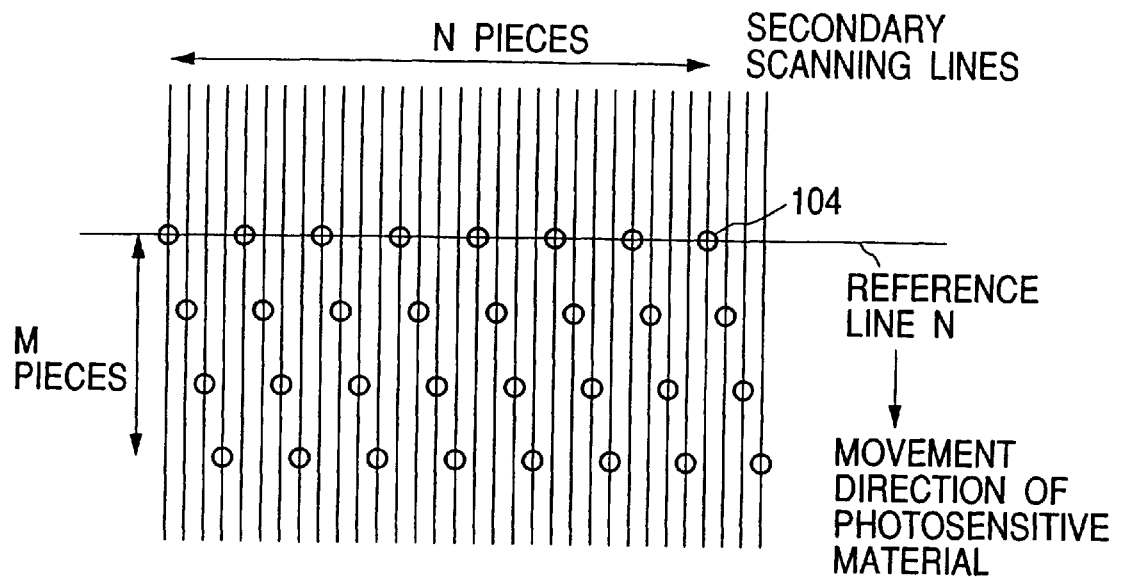
FIGS. 9A and 9B are explanatory drawings for explaining the arrangement of pixels formed on a photosensitive surface when a movement speed of the photosensitive surface is a little faster than a properly preset speed.
Figure 9B:
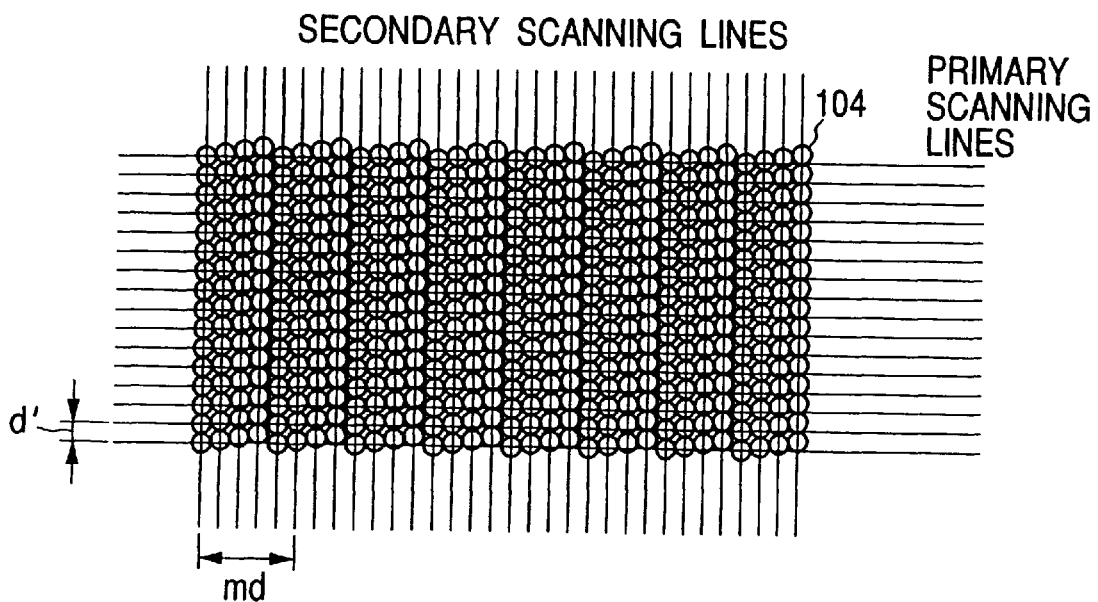

This value is smaller than the value ⅓ mm, which is a period that the pixel groups are not recognized as streaks, and the value of VTF obtained from the characteristic value shown in FIG. 2 is 0.16. The VTF value is a level that does not allow image noise generated in obtained images to be recognized, so that seemingly streak-free and excellent images improved in image quality are obtained.

As a comparison example, a description will be made for an unillustrated two-dimensional light-emitting element array having an about 1- by 25-mm area of a GaAs substrate in which 24 light-emitting elements to make up a unit are arranged at an interval of 42 μm on a reference line X crossing at an angle θ with a reference line Y wherein the reference line Y extends to a direction corresponding to a primary scanning direction on a photosensitive material and the reference line X crosses with the reference line Y at a predetermined angle θ (=87.61°), and 600 units are arranged in parallel at an interval of 42 μm along the reference line Y.

When images are formed in the same way as described above using the two-dimensional light-emitting element array having the above-described configuration as the light source of an image forming apparatus configured as shown in FIG. 5, as in the preceding example, 14,400 pixels will be produced at an interval of 21 μm over a width of about 300 mm in the primary scanning direction on the photosensitive surface of the rotation drum surface. However, the period of image noise is about 0.5 mm because m·d≈0.5 mm, where m=24 and d=21 μm.

This value is considerably larger than the value ⅓ mm, which is a period that the pixel groups are not recognized as streaks, and the value of VTF obtained from the characteristic value shown in FIG. 2 is 0.67. It will be appreciated that the VTF value is a level that allows image noise generated in obtained images to be recognized, and the images have streaks four times more conspicuous than those in the first embodiment.

Second Embodiment

A two-dimensional light-emitting element array shown in FIG. 3 has an about 0.5- by 50-mm area of the GaAs substrate 122 in which 12 light-emitting elements 102 to make up a unit U2 (a block of 12 light-emitting elements enclosed by the dashed line) are arranged at an interval of 42 μm in a V-character shape along a direction vertical to a reference line X wherein the reference line X extends to a direction corresponding to a primary scanning direction on a photosensitive material and the V shape is formed by two reference lines M1 and M2 that cross with the reference line Y at respectively different angles, and 1,200 units are arranged in parallel at an interval of 42 μm along the reference line Y.

When I is an integer from 1 to 12 (position of an I-th light-emitting element of one unit) and J is an integer from 1 to 1200 (position of J-th unit of all units), coordinates (x, y) of the light-emitting elements 106 can be represented by the following expressions:

when $I$ is from 1 to 6; $(x,y)=(84(I-1), 3.5(I-1)+84(J-1))$, and when $I$ is from 7 to 12; $(x,y)=(546-84(I-6), 3.5(I-1)+84(J-1))$.

When images are formed in the same way as described above using the two-dimensional light-emitting element array 121 having the above-described configuration as the light source 10 of an image forming apparatus configured as shown in FIG. 5, as in the preceding example, 14,400 pixels will be produced at an interval of 21 μm over a width of about 300 mm in the primary scanning direction on the photosensitive surface of the rotation drum surface.

In an image forming apparatus thus configured, the period of image noise that would be generated when the two-dimensional light-emitting element array 121 is misinstalled rotationally by an angle θ or when the rotation speed of the rotation drum 16 is deviated from a properly preset value would be about 0.25 mm because m·d≈0.25, where m=12 and d=21 μm.

As in the above-described first embodiment, this value is smaller than the value ⅓ mm, which is a period that the pixel groups are not recognized as streaks, and the value of VTF obtained from the characteristic value shown in FIG. 2 is 0.16. The VTF value is a level that does not allow image noise generated in obtained images to be recognized, so that seemingly streak-free and excellent images improved in image quality are obtained.

In the case of the second embodiment, since the arrangement of light-emitting elements making up one unit in a V-character shape reduces the distances between light-emitting elements at the end of units adjacent to each other, a change of scanning line density is small and streaks formed in the unit period of a pixel group formed by one unit become more difficult to recognize. According to the configuration of the second embodiment, since seeming degradation of image quality is smaller than that in the first embodiment, streaks are not seemingly recognized regardless of some possible degradation in installation precision of the two-dimensional light-emitting element array.

Third Embodiment

Figure 10:
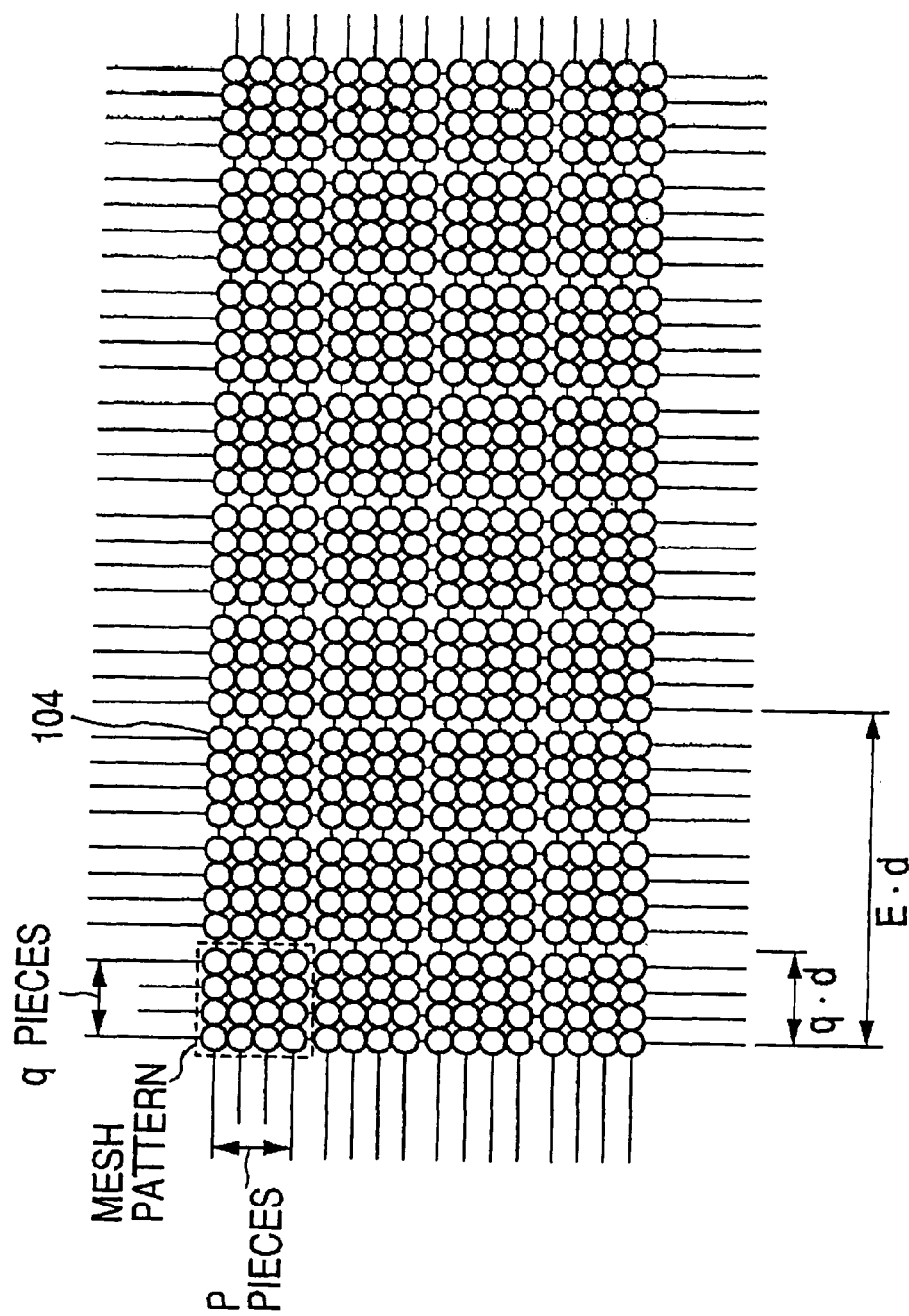
FIG. 10 is an explanatory drawing for explaining the arrangement of pixels when moire fringes occur by reproducing halftone using mesh patterns.

A description will be made of use of mesh patterns shown in FIG. 10 to reproduce halftone of images formed in the image forming apparatus described in the above-described first embodiment. The third embodiment assumes that a mesh pattern has 4 as the number q of pixels in the primary scanning direction and 4 as the number p of pixels in the secondary scanning direction. In this case, since the distance between adjacent pixels is 21 μm, a grid period is q·d=84 μm.

Since the number m of pixels of one unit is 12 and the number q of pixels of a mesh pattern in the primary scanning direction is 4, the least common multiple of both is 12 and the period E·d of moire fringes is the same as the period m·d of image noise coming from the light source. That is, in the third embodiment, since the number q of pixels of a mesh pattern in the primary scanning direction is defined as a divisor of the number m of light-emitting elements of one unit, the periods of image noise and moire fringes coming from an installation angle of the light source and the speed of the rotation drum coincide, so that the period of moire fringes is the same as the period of image noise.

Since the period of image noise coming from an installation angle of the light source and the speed of the rotation drum is adjusted to an unrecognizable level in the first embodiment, it can be appreciated that the period of moire fringes is also set to an unrecognizable level in the third embodiment.

Thus, even if mesh patterns are used to reproduce halftone, the period of moire fringes coincides with the period of image noise and is adjusted to an unrecognizable level, so that seemingly streak-free and excellent images improved in image quality are obtained.

As has been described above, according to an image forming apparatus of the invention of claims 1 to 3, regardless of a relative installation position error between a light source and a photosensitive material, or of a deviation from a properly preset value of rotation speed of a photosensitive material, an effect is obtained that images are produced with minimum loss of image quality and excellent reproducibility.

According to an image forming apparatus of claims 4 to 6, an effect is obtained that, even if mesh patterns are used to display a halftone, no moire fringes occur seemingly.

Furthermore, according to a two-dimensional light-emitting element array of claims 7 and 8, an effect is obtained that image noise generated by an installation position error or a movement speed error of a photosensitive material can be made inconspicuous.

What is claimed is:

1. An image forming apparatus, comprising:
    a two-dimensional light-emitting element array comprising a plurality of units in which a unit comprises at least 3 light-emitting elements arranged in a slanting direction with respect to a reference line extending in a direction to correspond to a primary scanning direction, and a plurality of units are arranged in parallel with the reference line, in such a way that each light-emitting element forms a pixel train comprising a plurality of irradiated areas disposed in a chain in a secondary scanning direction on a photosensitive surface by relative movement between the light-emitting element and the photosensitive material and that each unit forms a pixel group comprising a predetermined number of pixel trains on the photosensitive surface thereby the pixel trains are arranged regularly along the primary scanning direction on the photosensitive material, such that pixel trains at the end of pixel groups adjacent to each other, formed on the photosensitive surface by units adjacent to each other are formed regularly; and
    an optical system for projecting irradiated light from the two-dimensional light-emitting element array onto the photosensitive surface,
    wherein the number of light-emitting elements in one unit and the spacing between the pixel trains formed in a chain on the photosensitive surface are adjusted such that the width of said pixel group is smaller than a certain period that said pixel groups are not recognized as stripes.

2. The image forming apparatus according to claim 1, wherein at least the number of light-emitting elements of one unit or the spacing between the pixel trains formed in a chain on the photosensitive surface is adjusted such that the width of said pixel groups is $1/3$ mm or less.

3. The image forming apparatus according to claim 1, wherein said unit comprises a plurality of light-emitting elements arranged on two or more lines that extend in slanting directions with respect to the arrangement direction of said units.

4. An image forming apparatus, comprising:
    a two-dimensional light-emitting element array comprising a plurality of units in which a unit comprises at least 3 light-emitting elements arranged in a slanting direction with respect to a reference line extending in a direction to correspond to a primary scanning direction and a plurality of units are arranged in parallel with the reference line, in such a way that each light-emitting element forms a pixel train comprising a plurality of irradiated areas disposed in a chain in a secondary scanning direction on a photosensitive surface by relative movement between the light-emitting element and the photosensitive material and that each unit forms a pixel group comprising a predetermined number of pixel trains on the photosensitive surface thereby the pixel trains are arranged regularly along the primary scanning direction on the photosensitive material, such that pixel trains at the end of pixel groups adjacent to each other, formed on the photosensitive surface by units adjacent to each other are formed regularly,
    said image forming apparatus reproducing halftone by mesh patterns each consisting of a block of a predetermined number of pixels adjacent to each other on the photosensitive surface,
    wherein said image forming apparatus adjusts the number of pixels of said mesh patterns in the width direction along the arrangement direction of said units and the number of light-emitting elements in one unit such that the period of moire fringes determined by the least common multiple of the number of pixels of said mesh patterns along the direction on the photosensitive surface corresponding to the arrangement direction of said units and the number of light-emitting elements in said one unit is a period that the moire fringes are not recognized as streaks.

5. The image forming apparatus according to claim 4, wherein the number of pixels in the width direction of said mesh patterns is a divisor of the number of light-emitting elements in said one unit.

6. The image forming apparatus according to claim 4, wherein said image forming apparatus adjusts the number of pixels in the width direction of said mesh patterns and the number of light-emitting elements in said one unit such that the period of said moire fringes is $1/3$ mm or less.

7. A two-dimensional light-emitting element array, comprising:
    a plurality of units in which a unit comprises at least 3 light-emitting elements arranged in a slanting direction with respect to a reference line extending in a direction to correspond to a primary scanning direction and a plurality of units are arranged in parallel with the reference line, in such a way that each light-emitting element forms a pixel train comprising a plurality of irradiated areas disposed in a chain in a secondary scanning direction on a photosensitive surface by relative movement between the light-emitting element and the photosensitive material and that each unit forms a pixel group comprising a predetermined number of pixel trains on the photosensitive surface thereby the pixel trains are arranged regularly along the primary scanning direction on the photosensitive material, such that pixel trains at the end of pixel groups adjacent to each other, formed on the photosensitive surface by units adjacent to each other are formed regularly,
    wherein the number of light-emitting elements in one unit is determined such that the width of pixel groups formed on the photosensitive surface through a projection lens system with a predetermined magnification is a period that said pixel groups are not recognized as streaks.

8. The two-dimensional light-emitting element array according to claim 7, wherein the number of light-emitting elements in one unit is adjusted such that said the width of said pixel groups is $1/3$ mm or less.

* * * * *